(12) United States Patent
Aono et al.

(10) Patent No.: US 11,366,255 B2
(45) Date of Patent: Jun. 21, 2022

(54) CONCAVE DIFFRACTION GRATING, METHOD FOR PRODUCING THE SAME, AND OPTICAL DEVICE

(71) Applicant: HITACHI HIGH-TECH CORPORATION, Tokyo (JP)

(72) Inventors: Takanori Aono, Tokyo (JP); Yoshisada Ebata, Tokyo (JP); Kenta Yaegashi, Tokyo (JP); Shigeru Matsui, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 0 days.

(21) Appl. No.: 17/258,818

(22) PCT Filed: Apr. 24, 2019

(86) PCT No.: PCT/JP2019/017442
§ 371 (c)(1),
(2) Date: Jan. 8, 2021

(87) PCT Pub. No.: WO2020/044658
PCT Pub. Date: Mar. 5, 2020

(65) Prior Publication Data
US 2021/0271008 A1    Sep. 2, 2021

(30) Foreign Application Priority Data

Aug. 29, 2018 (JP) .............................. JP2018-160640

(51) Int. Cl.
*G01J 3/28* (2006.01)
*G02B 5/18* (2006.01)
(Continued)

(52) U.S. Cl.
CPC .............. *G02B 5/1861* (2013.01); *G01J 3/18* (2013.01); *G02B 5/1857* (2013.01); *G02B 27/0037* (2013.01); *G01J 2003/1842* (2013.01)

(58) Field of Classification Search
CPC ........ G01J 3/28; G01J 3/14; G01J 3/18; G01J 2003/1842; G01J 3/0208; G01J 3/0297;
(Continued)

(56) References Cited

U.S. PATENT DOCUMENTS

| 4,012,843 A | 3/1977 | Harada et al. |
| 4,192,994 A * | 3/1980 | Kastner ................ G02B 5/1838 |
| | | 356/334 |

(Continued)

FOREIGN PATENT DOCUMENTS

| CN | 106482832 A | 3/2017 |
| CN | 106574998 A | 4/2017 |

(Continued)

OTHER PUBLICATIONS

International Search Report of PCT/JP2019/017442 dated Jul. 30, 2019.
(Continued)

*Primary Examiner* — Abdullahi Nur
(74) *Attorney, Agent, or Firm* — Mattingly & Malur, PC (57) ABSTRACT

The present invention provides a concave diffraction grating capable of improved diffraction efficiency by suppressing spherical aberration. The concave diffraction grating is a concave diffraction grating 2 for dispersing and focusing light and comprises sawtooth grating grooves 21 on a concave substrate 24, with the sawtooth grating grooves 21 being unequally spaced. The concave diffraction grating 2 for dispersing and focusing light is formed by preparing a planar diffraction grating with a sawtooth shape which is formed on a planar substrate by photo-lithography and
(Continued)

etching or machining and which forms unequally spaced grating grooves 21, deforming and mounting the planar diffraction grating along a fixed convex substrate to obtain a mold of a concave diffraction grating, and transferring the mold of the concave diffraction grating to the surface of a metal or a resin.

7 Claims, 8 Drawing Sheets

(51) Int. Cl.
  *G01J 3/18* (2006.01)
  *G02B 27/00* (2006.01)
(58) Field of Classification Search
  CPC ........ G01J 3/20; G01J 3/2803; G02B 5/1861; G02B 5/1857; G02B 27/0037
  See application file for complete search history.

(56) References Cited

U.S. PATENT DOCUMENTS 4,798,446 A * 1/1989 Hettrick ............... G02B 5/1838
                                              359/570
9,372,290 B2    6/2016 Ko et al.

FOREIGN PATENT DOCUMENTS

| JP | 55-013918 A | 1/1980 |
| JP | 57-033562 B2 | 7/1982 |
| JP | 09-015410 A | 1/1997 |
| JP | 2004-053992 A | 2/2004 |
| JP | 2008-051822 A | 3/2008 |
| JP | 2011-106842 A | 6/2011 |
| WO | 2016/059928 A1 | 4/2016 |

OTHER PUBLICATIONS

Chinese Office Action issued in corresponding Chinese Application No. 201980042410.3 dated Jan. 6, 2022.
Extended European Search Report received in corresponding European Application No. 19855273.9 dated Apr. 5, 2022.
Palmer, C. et al., "Diffraction Grating Handbook Sixth Edition", Feb. 2, 2005, pp. 1-271, URL: http://optics.sgu.ru/~ulianov/Students/Books/Applied_Optics/E. Loewen Diffraction on Grating Handbook (2005).pdf.
Michels, D. J., "Change of Blaze Wavelength as a Function of Position on the Surfacce of a Concave Grating", Journal of the Optical Society of America, May 1974, pp. 662-666, vol. 64, No. 5

* cited by examiner

A—A CROSS-SECTION

CONCAVE DIFFRACTION GRATING, METHOD FOR PRODUCING THE SAME, AND OPTICAL DEVICE

TECHNICAL FIELD

The present invention relates to a concave diffraction grating and a method for producing the same, and more particularly to a curved diffraction grating for dispersing and converging light and an optical device using the same.

BACKGROUND ART

As the background technology in the present technical field, a curved diffraction grating being an optical element mounted on an optical device such as a spectrophotometer has both light dispersion and convergence performances. Thus, it is possible to reduce the number of components and to simplify the configuration of a device.

Conventionally, in a spherical concave diffraction grating, if a spacing between grating grooves is equal, the spectral light is focused on the Roland circle. Thus, it is possible to improve the performance of an optical device by installing a detector on the Roland circle. However, there is a concern that the size of the optical device may be increased by installing the detector on the Roland circle. Therefore, by making a spacing between the grating grooves formed in the concave diffraction grating be unequal, it is possible to correct the focusing position, that is, the installation location of the detector from the Roland circle to an approximate linear position, and thus to reduce the size of the optical device. In order to realize such a spherical concave diffraction grating, for example, the methods disclosed in PTLs 1 to 3 have been proposed.

Regarding a concave diffraction grating, a mold of the concave diffraction grating is produced by a method of engraving a grating groove on a convex substrate with a machine such as a ruling engine. Then, the engraved grating groove is transferred to resin, metal, and the like, and thereby producing the concave diffraction grating. In the spherical concave diffraction grating, the aberration of the spectral light is suppressed by setting the spacing between the grating grooves to be unequal, as disclosed in PTL 1.

Further, in PTL 2, a resist is formed on a concave substrate so that a spacing between grating grooves is unequal, and a laminar type (rectangular) grating groove is formed by ion etching to produce a concave diffraction grating. In PTL 3, a planar diffraction grating having a sawtooth grating groove is interposed between uneven surface substrates, is deformed, and is joined onto a convex surface substrate to form a mold of a concave diffraction grating. The concave diffraction grating is produced by transferring the mold of the concave diffraction grating to metal, resin, or the like.

CITATION LIST

Patent Literature

PTL 1: JP S55-13918 A
PTL 1: JP 2011-106842 A
PTL 3: WO 2016/059928

SUMMARY OF INVENTION

Technical Problem

In a spherical concave diffraction grating, if the spacing between grating grooves is equal, the spectral light is focused on the Roland circle. Thus, it is possible to improve the performance of an optical device by installing a detector on the Roland circle. However, there is a concern that the size of the optical device may be increased by installing the detector on the Roland circle. Therefore, by making the spacing between the grating grooves formed in the concave diffraction grating be unequal, it is possible to correct the focusing position, that is, the installation location of the detector from the Roland circle to an approximate linear position, and thus to reduce the size of the optical device. However, there are problems as follows.

In the method for producing a concave diffraction grating, which is disclosed in PTL 1, if a mold of a diffraction grating is produced by the method of engraving a convex substrate with a machine such as a ruling engine, the angle of the engraving tool is constant. Thus, there is a problem that a shallow portion and a deep portion are formed in a sawtooth grating groove at the center portion and the end portion of a curved substrate, and thus a blaze angle is not constant.

In the method for producing a curved diffraction grating using a semiconductor process, which is disclosed in PTL 2, it is difficult to accurately produce a grating groove pattern of the resist on any curved substrate by photo-lithography, and etching on the curved surface may cause a problem that a laminar type (rectangular) grating groove having an inclination is formed from the perpendicular line of the curved surface.

In the technique for producing a mold of a curved diffraction grating, which is disclosed in PTL 3, a sawtooth grating groove is formed on a planar substrate and then joined to a curved surface. Thus, it is possible to produce a concave diffraction grating having a constant blaze angle even at the center portion and the end portion of a curved substrate. However, suppression of aberrations is insufficient because the grating grooves are evenly spaced. The diffraction efficiency is lowered. Thus, it is not possible to effectively utilize detected light.

Further, if the laminar type diffraction grating disclosed in PTL 2 is produced on a planar substrate and the method disclosed in PTL 3 is applied, it is possible to produce the curved diffraction grating that does not have an inclination in the perpendicular direction of the curved surface and has rectangular grating groove with the unequal spacing. However, the curved diffraction grating is interposed between the uneven surface substrates. Thus, if a load is applied, the load is applied to the rectangular grating groove, and the rectangular grating groove may be damaged. In addition, when the mold of the concave diffraction grating is transferred, there is a problem that it is difficult to separate the concave diffraction grating from the mold because the rectangular grating groove is engaged.

Therefore, the present invention provides a concave diffraction grating capable of improved diffraction efficiency by suppressing spherical aberration.

Further, the present invention provides an optical device in which it is possible to improve the diffraction efficiency by suppressing the spherical aberration and to install the detector on a straight line, by mounting the concave diffraction grating including grating grooves having a sawtooth shape with a constant blaze angle and arranged at the unequal spacing on the optical device.

Solution to Problem

In order to solve the above problems, a concave diffraction grating according to the present invention disperses and focuses light. The concave diffraction grating includes a sawtooth grating groove on a concave substrate. The spacing between the sawtooth grating grooves is unequal.

Further, according to the present invention, a concave diffraction grating is for dispersing and focusing light. The concave diffraction grating is formed by preparing a planar diffraction grating with a sawtooth shape which is formed on a planar substrate by photo-lithography and etching or machining and which forms unequally spaced grating grooves, deforming and mounting the planar diffraction grating along a fixed convex substrate to obtain a mold of a concave diffraction grating, and transferring the mold of the concave diffraction grating to a surface of a metal or a resin.

Further, according to the present invention, a concave diffraction grating is for dispersing and focusing light. The concave diffraction grating is formed by preparing a first planar diffraction grating substrate with a sawtooth shape which is formed on a planar substrate by photo-lithography and etching or machining and which forms unequally spaced grating grooves, deforming and mounting a second diffraction grating substrate in a planar shape onto which a diffraction grating pattern formed on the first planar diffraction grating substrate is transferred, along a fixed convex substrate to obtain a mold of a concave diffraction grating, and transferring the mold of the concave diffraction grating to a surface of a metal or a resin.

Further, according to the present invention, an optical device includes a first focusing lens that focuses light emitted from a light source and irradiates a sample with the light, a second focusing lens that focuses transmitted light obtained by light being transmitted through the sample, to an opening portion of a slit, and a concave diffraction grating that wavelength-disperses the light that is transmitted through the opening portion of the slit and guides the light to a plurality of detectors. The concave diffraction grating has sawtooth grating grooves on a concave substrate, and a spacing between the sawtooth grating grooves is unequal.

Further, according to the present invention, there is provided a method for producing a concave diffraction grating. The method includes (1) a step of forming a sawtooth shape on a planar substrate by photo-lithography and etching or machining to form unequal spacing grating grooves and to prepare a planar diffraction grating substrate, (2) a step of installing a concave substrate so that a concave surface faces a surface on which the grating grooves are formed and installing a convex substrate through an adhesive layer so that a convex surface faces an opposite surface of the surface on which the grating grooves are formed, (3) a bonding step of imitating the surface of the planar diffraction grating substrate, on which the grating grooves are formed, onto the concave substrate, and bonding the planar diffraction grating substrate to the convex substrate by the adhesive layer, (4) a step of detaching the concave substrate, and then removing an outer peripheral portion which is outside the convex surface of the convex substrate in the planar diffraction grating substrate, so as to form a mold of a concave diffraction grating, and (5) a step of transferring the mold of the concave diffraction grating to a surface of metal or resin.

Advantageous Effects of Invention

According to the present invention, it is possible to provide a concave diffraction grating capable of improving diffraction efficiency by suppressing spherical aberration.

In addition, according to the present invention, it is possible to provide an optical device in which it is possible to improve the diffraction efficiency by suppressing the spherical aberration and to install the detector on a straight line, by mounting the concave diffraction grating including grating grooves having a sawtooth shape with a constant blaze angle and arranged at the unequal spacing on the optical device.

Objects, configurations, and advantageous effects other than those described above will be clarified by the descriptions of the following embodiments.

BRIEF DESCRIPTION OF DRAWINGS

FIG. 6($a$) is a diagram illustrating a step of preparing the mold of the concave diffraction grating; FIG. 6($b$) is a diagram illustrating a step of forming a metal layer on the mold of the concave diffraction grating; FIG. 6($c$) is a diagram illustrating a step of installing a concave substrate on the metal layer; and FIG. 6($d$) is a diagram illustrating a step of obtaining the concave diffraction grating by being separated from the mold of the concave diffraction grating.

FIG. 7($a$) is a diagram illustrating a step of forming a metal diffraction grating; FIG. 7($b$) is a diagram illustrating a step of installing a concave substrate above the metal diffraction grating and installing a convex substrate below the metal diffraction grating; FIG. 7($c$) is a diagram illustrating a bonding step; FIG. 7($d$) is a diagram illustrating a step of detaching the concave substrate; and FIG. 7($e$) is a diagram illustrating a step of obtaining the mold of the concave diffraction grating by removing an outer peripheral portion of the metal diffraction grating.

FIG. 8($a$) is a diagram illustrating a step of forming a planar diffraction grating; FIG. 8($b$) is a diagram illustrating a step of forming a metal diffraction grating; FIG. 8($c$) is a diagram illustrating a step of separating the metal diffraction grating from the planar diffraction grating; FIG. 8($d$) is a diagram illustrating a step of installing a concave substrate above the metal diffraction grating and installing a convex substrate below the metal diffraction grating; FIG. 8($e$) is a diagram illustrating a bonding step; FIG. 8($f$) is a diagram illustrating a step of detaching the concave substrate; and FIG. 8($g$) is a diagram illustrating a step of obtaining the mold of the concave diffraction grating by removing an outer peripheral portion of the metal diffraction grating.

FIG. 9(a) is a diagram illustrating a step of forming a metal diffraction grating; FIG. 9(b) is a diagram illustrating a step of installing a concave substrate above the metal diffraction grating and installing a convex substrate below the metal diffraction grating; FIG. 9(c) is a diagram illustrating a bonding step; FIG. 9(d) is a diagram illustrating a step of detaching the concave substrate; and FIG. 9(e) is a diagram illustrating a step of obtaining the mold of the concave diffraction grating by removing an outer peripheral portion of the metal diffraction grating.

FIG. 10(a) is a diagram illustrating a step of forming a planar diffraction grating; FIG. 10(b) is a diagram illustrating a step of stacking a metal material; FIG. 10(c) is a diagram illustrating a step of forming a metal diffraction grating; FIG. 10(d) is a diagram illustrating a step of installing a concave substrate above the metal diffraction grating and installing a convex substrate below the metal diffraction grating; FIG. 10(e) is a diagram illustrating a bonding step; FIG. 10(f) is a diagram illustrating a step of detaching the concave substrate; and FIG. 10(g) is a diagram illustrating a step of obtaining the mold of the concave diffraction grating by removing an outer peripheral portion of the metal diffraction grating.

DESCRIPTION OF EMBODIMENTS

Hereinafter, embodiments of the present invention will be described with reference to the drawings.

Embodiment 1

Figure 1:
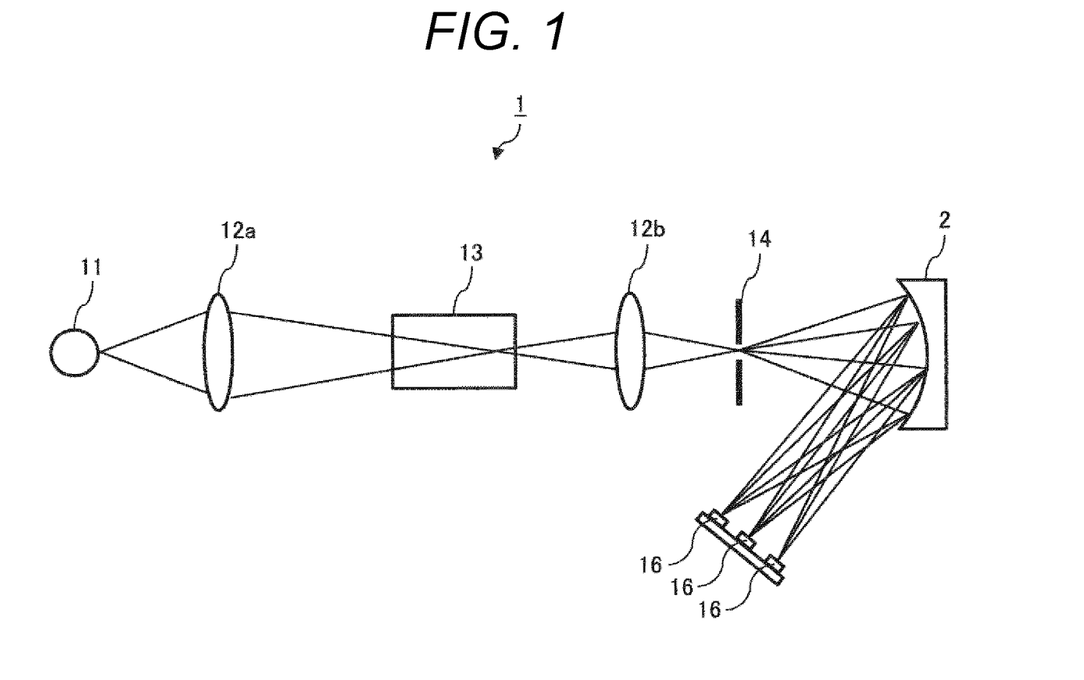
FIG. 1 is an overall schematic block diagram illustrating an optical device using a concave diffraction grating in Embodiment 1 according to an embodiment of the present invention.

FIG. 1 is an overall schematic block diagram illustrating an optical device using a concave diffraction grating in Embodiment 1 according to an embodiment of the present invention. An optical device 1 selectively absorbs light having a wavelength unique to a chemical bond of a chemical substance, a biological substance, or the like, and is used for concentration measurement and substance identification. As illustrated in FIG. 1, the optical device 1 includes a white light source 11, a focusing lens 12a, a sample chamber 13, a focusing lens 12b, a slit 14, a concave diffraction grating 2, and detectors 16 arranged on a plurality of straight lines.

Light from the white light source 11 is focused by the focusing lens 12a, and a measurement target in the sample chamber 13 is irradiated with the focused light. Light transmitted through the sample chamber 13 is focused on an opening portion of the slit 14 by the focusing lens 12b. Light that has passed through the slit 14 is wavelength-dispersed by the concave diffraction grating 2 to form a spectrum. The detector 16 detects the formed spectrum.

Figure 2:
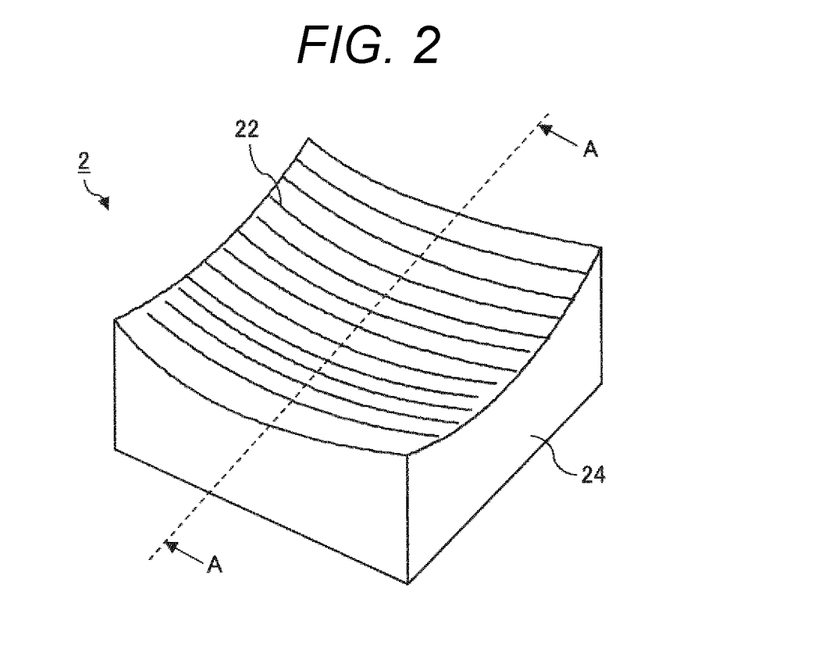
FIG. 2 is a perspective view schematically illustrating a configuration of the concave diffraction grating (spherical diffraction grating) illustrated in FIG. 1.
Figure 3:
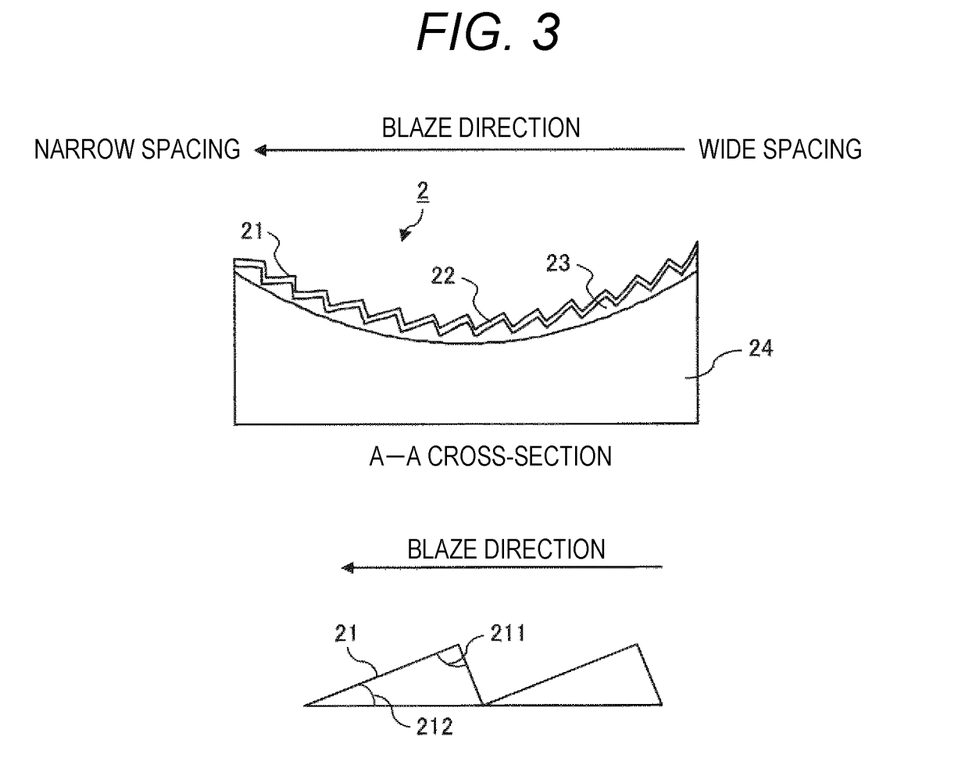
FIG. 3 is an arrow view illustrating an A-A cross-section of the concave diffraction grating illustrated in FIG. 2 and is an enlarged view of grating grooves.

The concave diffraction grating 2 will be described. FIG. 2 is a perspective view schematically illustrating a configuration of the concave diffraction grating 2 illustrated in FIG. 1. FIG. 3 is an arrow view illustrating an A-A cross-section of the concave diffraction grating 2 illustrated in FIG. 2 and is an enlarged view of grating grooves. As illustrated in FIGS. 2 and 3, the concave diffraction grating 2 includes a concave substrate 24 having a curvature, a metal layer 22 on which a grating groove 21 is formed, and a resin layer 23 for fixing the metal layer 22 on the concave substrate 24. The reflective surface (surface) of the concave diffraction grating forms a portion of a spherical surface. Therefore, the concave diffraction grating may be referred to as a spherical diffraction grating. In a concave diffraction grating having equal spacing grating grooves, an image is formed on a Roland circle. On the other hand, as illustrated in FIG. 3, in the concave diffraction grating 2 in which the spacing between the grating grooves 21 is arithmetically reduced in a blaze direction, an image can be formed approximately on a straight line. In other words, in the concave diffraction grating 2 in which the spacing between the grating grooves 21 is gradually reduced in the blaze direction, an image can be formed approximately on a straight line. Here, as illustrated in FIG. 3, the blaze direction is defined as a direction from an apex angle 211 of the sawtooth grating groove 21 to an apex having the minimum angle (blaze angle 212). Therefore, such a concave diffraction grating has a shape in which the spacing between the grating grooves 21 adjacent to each other gradually changes from a wide spacing to a narrow spacing in the blaze direction.

As described above, the concave diffraction grating 2 in which the spacing is arithmetically reduced in the blaze direction is applied to the optical device 1 illustrated in FIG. 1, and thereby a plurality of detectors 16 can be arranged on a straight line. Thus, it is possible to simplify mounting of the detectors 16 and to reduce the size of the optical device 1.

Further, since the concave diffraction grating 2 has a constant blaze angle 212, it is possible to selectively disperse light having a unique wavelength. Accordingly, it is possible to obtain the optical device 1 having low noise (stray light) and to improve detection efficiency.

As described above, according to the present embodiment, it is possible to provide a concave diffraction grating capable of improving diffraction efficiency by suppressing spherical aberration.

In addition, according to the present embodiment, it is possible to provide an optical device in which it is possible to improve the diffraction efficiency by suppressing the spherical aberration and to install the detector on a straight line, by mounting the concave diffraction grating including grating grooves having a sawtooth shape with a constant blaze angle and arranged at the unequal spacing on the optical device.

In addition, according to the present embodiment, since it is possible to install the detectors on a straight line, it is possible to realize a small optical device.

Further, it is possible to realize a low-cost optical device having a small number of optical element components.

Embodiment 2

Figure 4:
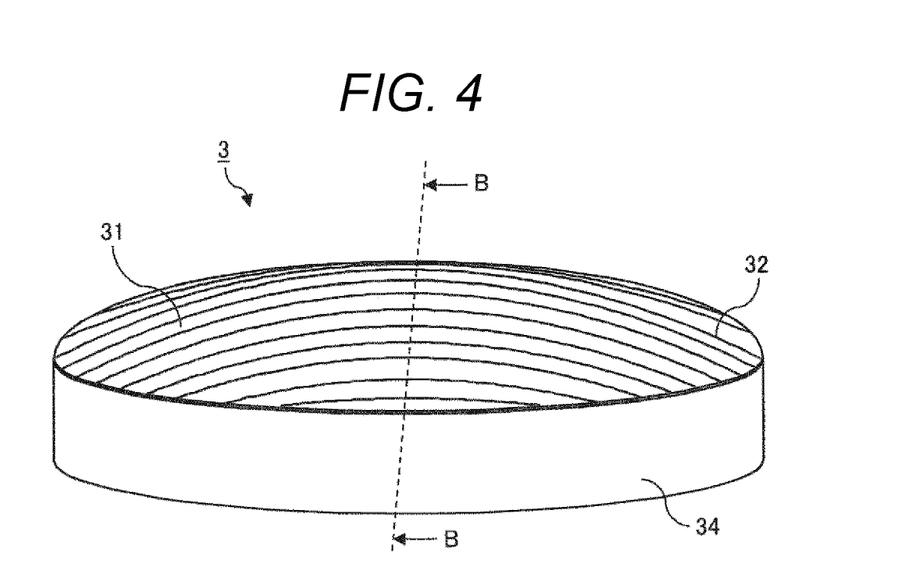
FIG. 4 is a perspective view schematically illustrating a configuration of a mold of a concave diffraction grating (spherical diffraction grating) in Embodiment 2 according to another embodiment of the present invention.
Figure 5:
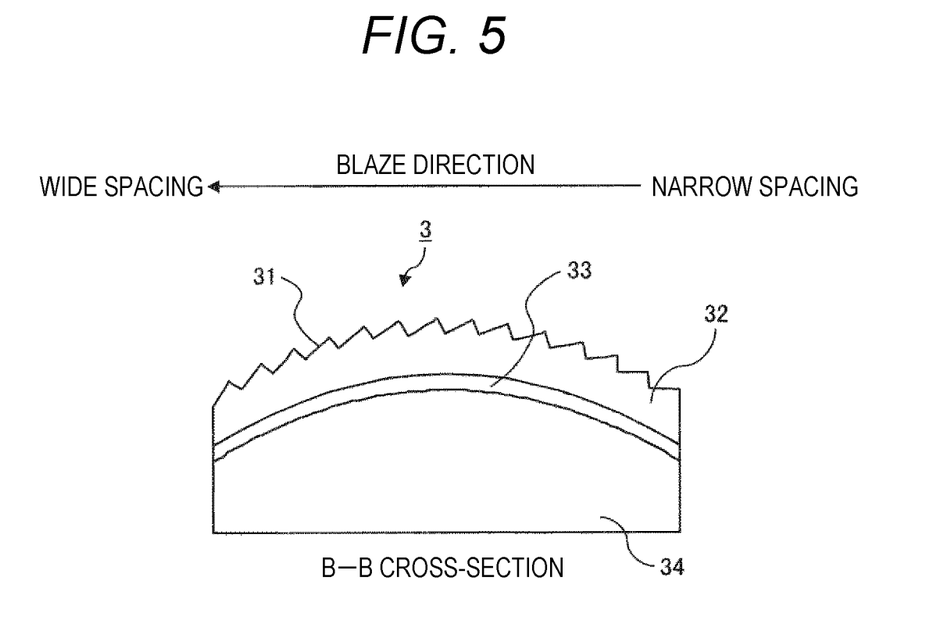
FIG. 5 is an arrow view illustrating a B-B cross-section of the mold of the concave diffraction grating illustrated in FIG. 4.

A structure of a mold of the concave diffraction grating and a method for producing the concave diffraction grating will be described with reference to FIGS. 4 to 6. FIG. 4 is a perspective view schematically illustrating a configuration of a mold of a concave diffraction grating in Embodiment 2 according to another embodiment of the present invention. FIG. 5 is an arrow view illustrating a B-B cross-section of the mold of the concave diffraction grating illustrated in FIG. 4.

As illustrated in FIGS. 4 and 5, a mold 3 of the concave diffraction grating is configured by a convex substrate 34 having a curvature, a metal diffraction grating 32 which is a metal film on which a grating groove 31 is formed, and an adhesive layer 33 for fixing the metal diffraction grating 32 being the metal film, on the convex substrate 34. As illustrated in FIG. 5, the spacing between the grating grooves 31 of the metal diffraction grating 32 forming the mold 3 of the concave diffraction grating is arithmetically increased in the blaze direction. In other words, the spacing between the grating grooves 31 of the metal diffraction grating 32 is gradually increased in the blaze direction. Therefore, along the blaze direction, the metal diffraction grating 32 forming the mold 3 of the concave diffraction grating has a shape in which the spacing between the grating grooves 31 adjacent to each other gradually changes from a narrow spacing to a wide spacing.

Next, a direction of producing the concave diffraction grating 2 described in Embodiment 1 described above will be described. FIG. 6 is a diagram illustrating a method for producing a concave diffraction grating using the mold of the concave diffraction grating illustrated in FIG. 4. FIG. 6(a) is a diagram illustrating a step of preparing the mold of the concave diffraction grating. FIG. 6(b) is a diagram illustrating a step of forming a metal layer on the mold of the concave diffraction grating. FIG. 6(c) is a diagram illustrating a step of installing a concave substrate on the metal layer. FIG. 6(d) is a diagram illustrating a step of obtaining the concave diffraction grating by being separated from the mold of the concave diffraction grating.

Firstly, the mold 3 of the concave diffraction grating having the sawtooth grating grooves 31 is prepared in the step of preparing a mold of a concave diffraction grating illustrated in FIG. 6(a).

Then, in the step of forming a metal layer on the mold of the concave diffraction grating illustrated in FIG. 6(b), a separation layer (not illustrated) and the metal layer 22 are formed on the mold 3 of the concave diffraction grating having the sawtooth grating grooves 31. In the step of installing a concave substrate on the metal layer illustrated in FIG. 6(c), the resin layer 23 is formed on the metal layer 22, and then the concave substrate 24 is installed on the resin layer 23.

In the step of obtaining the concave diffraction grating by being separated from the mold of the concave diffraction grating illustrated in FIG. 6(d), the resin layer 23 is cured, and then the metal layer 22, the resin layer 23, and the concave substrate 24 are removed from the mold 3 of the concave diffraction grating. In this manner, the concave diffraction grating 2 is produced.

Note that, the grating groove 31 may be transferred to the resin layer 23 by a technique such as nanoimprint using the mold 3 of the concave diffraction grating, and then the metal layer 22 may be formed on the surface thereof. Here, the concave diffraction grating 2 is formed by transferring the mold 3 of the concave diffraction grating. Thus, as illustrated in the right figure of FIG. 6, in order to form the concave diffraction grating 2 in which the spacing between the grating grooves 21 is arithmetically reduced from the apex angle 211 toward the apex having the blaze angle 212, that is, in the blaze direction (blaze direction of the concave diffraction grating 2), it is necessary to form the concave diffraction grating by arithmetically increasing the spacing between the grating grooves 31 of the mold 3 of the concave diffraction grating, from an apex angle 311 toward an apex having a blaze angle 312, that is, in the blaze direction (blaze direction of the mold 3 of the concave diffraction grating).

As described above, according to the present embodiment, it is possible to easily produce the concave diffraction grating 2 described in Embodiment 1 described above.

Next, a method for producing the mold of the concave diffraction grating will be described. A plurality of producing methods as follows can be used in the method for producing the concave diffraction grating represented by the spherical diffraction grating.

Embodiment 3

Figure 7:
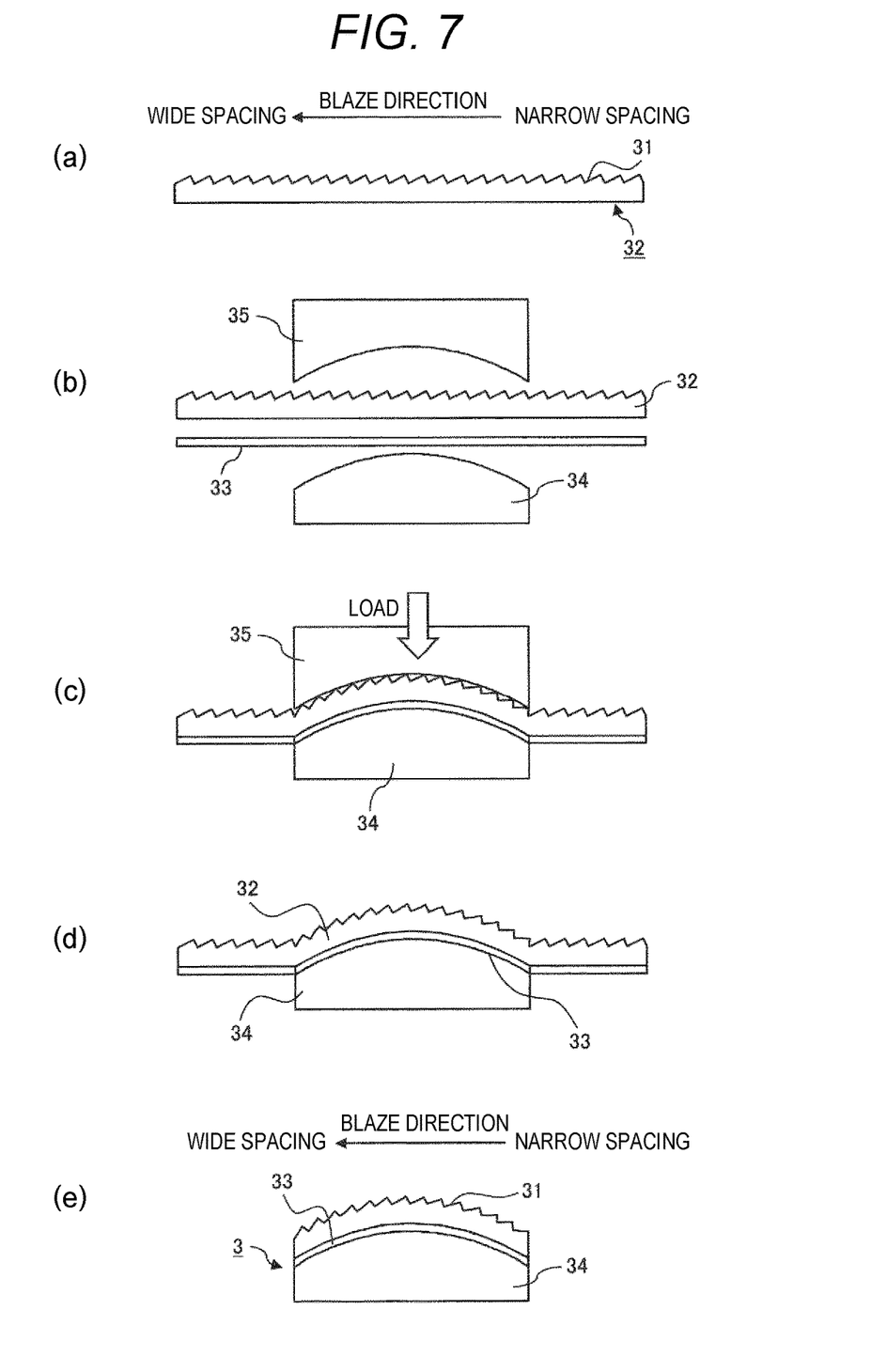
FIG. 7 is a diagram illustrating a method for producing a mold of a concave diffraction grating in Embodiment 3 according to still another embodiment of the present invention.

FIG. 7 is a diagram illustrating a method for producing a mold of a concave diffraction grating in Embodiment 3 according to still another embodiment of the present invention. FIG. 7(a) is a diagram illustrating a step of forming a metal diffraction grating. FIG. 7(b) is a diagram illustrating a step of installing a concave substrate above the metal diffraction grating and installing a convex substrate below the metal diffraction grating. FIG. 7(c) is a diagram illustrating a bonding step. FIG. 7(d) is a diagram illustrating a step of detaching the concave substrate. FIG. 7(e) is a diagram illustrating a step of obtaining the mold of the concave diffraction grating by removing an outer peripheral portion of the metal diffraction grating.

In the process of forming a metal diffraction grating illustrated in FIG. 7(a), the grating grooves 31 that have a sawtooth shape and have a spacing that is arithmetically increased in the blaze direction is mechanically engraved on a planar metal substrate, and thereby the metal diffraction grating 32 is formed. In other words, the spacing between the grating grooves 31 of the metal diffraction grating 32 is gradually increased in the blaze direction. Therefore, the metal diffraction grating 32 has a shape in which the spacing between the grating grooves 31 adjacent to each other gradually changes from the narrow spacing to the wide spacing in the blaze direction.

Then, in the step of installing a concave substrate above the metal diffraction grating and installing a convex substrate below the metal diffraction grating, illustrated in FIG. 7(b), the surface of the metal diffraction grating 32 on which the grating grooves 31 are formed is set as a concave substrate 35 side, and the adhesive layer 33 is installed on an opposite surface of the surface on which the grating grooves 31 are formed, that is, on a convex substrate 34 side. That is, the concave substrate 35 is installed above the surface of the metal diffraction grating 32 on which the grating grooves 31 are formed, so that the concave surface of the concave substrate 35 faces the surface of the metal diffraction grating 32 on which the grating grooves 31 are formed, and the adhesive layer 33 is installed below an opposite surface of the surface of the metal diffraction grating 32 on which the grating grooves 31 are formed, so that the lower surface of the adhesive layer 33 faces the convex surface of the convex substrate 34.

In the bonding step illustrated in FIG. 7(c), in a vacuum atmosphere, a temperature which is equal to or higher than the softening point of the adhesive layer 33 and a load are applied so that the formation surface of the grating groove 31 of the metal diffraction grating 32 is imitated on the concave substrate 35. In addition, the metal diffraction grating 32 is bonded to the convex surface of the convex substrate 34 by the adhesive layer 33.

Then, in the step of detaching the concave substrate illustrated in FIG. 7(d), the adhesive layer 33 is cured by cooling with the load applied, and then the concave substrate 35 is detached (removed). Subsequently, in the step of obtaining the mold of the concave diffraction grating by removing the outer peripheral portion of the metal diffraction grating illustrated in FIG. 7(e), the mold 3 of the concave diffraction grating is formed by removing the outer peripheral portion of the metal diffraction grating 32 deformed on the curved surface (outer peripheral portion which is outside the convex surface of the convex substrate 34 in the metal diffraction grating 32).

Since the metal diffraction grating 32 is deformed into the curved surface by imitating the concave substrate 35, the surface on which the grating grooves 31 are formed serves as the surface accuracy of the concave substrate 35. Further, the adhesive layer 33 is softened during bonding, and thus can absorb the influence of the thickness variation of the metal diffraction grating 32 and the surface accuracy variation of the convex substrate 34.

The metal diffraction grating 32 in which the grating grooves 31 are formed on a metal planar substrate is produced by mechanical engraving or a semiconductor process (photo-lithography and etching), or the metal diffraction grating 32 is produced in a manner that a planar diffraction grating on which the grating grooves 31 are formed is transferred to a metal planar substrate by mechanical engraving or a semiconductor process. Sputtering, vapor deposition, and plating are used to transfer the grating grooves of the planar diffraction grating to the metal planar substrate. The mold 3 of the concave diffraction grating is produced by deforming the metal diffraction gratings 32 into the curved surface and mounting the metal diffraction gratings on the convex substrate 34.

Figure 6:
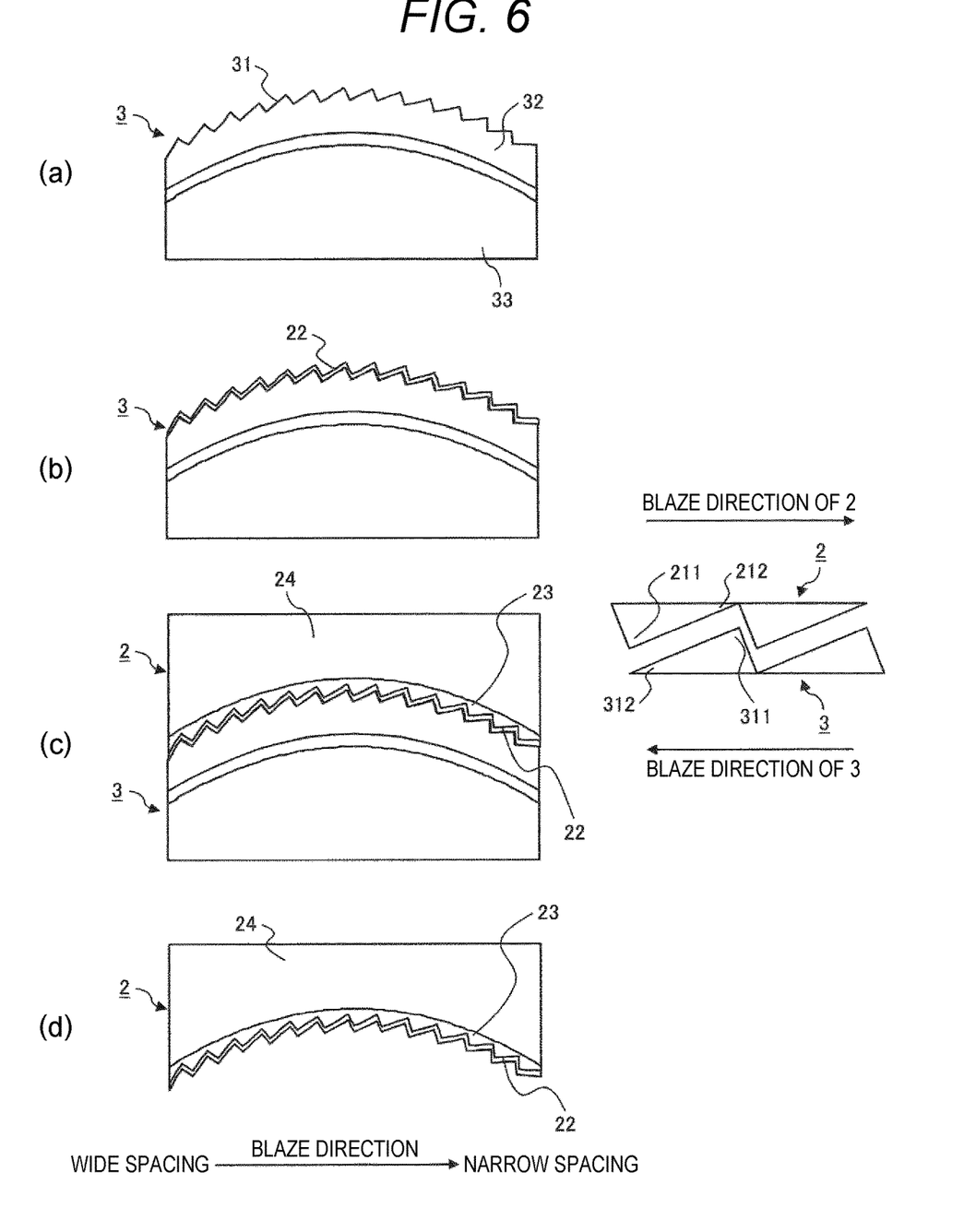
FIG. 6 is a diagram illustrating a method for producing a concave diffraction grating using the mold of the concave diffraction grating illustrated in FIG. 4.

The mold 3 of the concave diffraction grating is transferred to the metal layer 22 and the resin layer 23 by the method illustrated in FIG. 6 in Embodiment 1 described above, and thus the concave diffraction grating 2 is produced.

When the grating grooves 31 are formed on a planar substrate by mechanical engraving, the angle of the engraving tool is constant. Thus, the sawtooth grating groove 31 having a constant blaze angle 312 can be formed to have small shape variation on the entire surface of the substrate.

When the grating grooves 31 are formed on a planar substrate by a semiconductor process, the sawtooth grating groove 31 having a constant blaze angle 312 (FIG. 6) can be easily formed to have small shape variation, in comparison to photo-lithography and etching on a curved surface. In addition, a conventional device used for photo-lithography and etching can be applied. Since the planar diffraction grating substrate (metal diffraction grating) 32 produced by the above method is deformed into the curved surface, and then is mounted on the convex substrate 34, it is possible to produce the mold 3 of the concave diffraction grating having grating grooves 31 in which a sawtooth shape having a substantially constant blaze angle is provided, and the spacing is arithmetically changed in the blaze direction on the entire surface of the curved surface (convex surface).

In the deformation of the metal diffraction grating 32 into the curved surface and mounting the metal diffraction grating on the convex substrate 34, the metal diffraction grating 32 is interposed between the concave substrate 35 and the convex substrate 34 having high surface accuracy. The load and the temperature are applied to produce the mold 3 of the concave diffraction grating. Since the surface of the metal diffraction grating 32 on which the grating grooves 31 are formed is imitated to the concave substrate 35, it is possible to improve the surface accuracy of the mold 3 of the concave diffraction grating without influences of the substrate thickness variation of the metal diffraction grating 32, the thickness variation of the adhesive layer 33 for fixing the metal diffraction grating 32 and the convex substrate 34, the surface accuracy of the convex substrate, and the like. When the metal diffraction grating 32 is interposed between the concave substrate 35 and the convex substrate 34 and is deformed into the curved surface by applying a load, there is a concern that the grating groove 31 may be deformed or crushed. Since the load applied to the grating grooves 31 from the concave substrate 35 is distributed in a direction adjacent to the apex angle 311 (FIG. 6) of the sawtooth grating grooves 31, it is possible to produce the mold 3 of the concave diffraction grating without deformation or crushing.

As described above, according to the present embodiment, it is possible to produce the mold 3 of the concave diffraction grating having the grating grooves 31 that have a sawtooth shape having a substantially constant blaze angle and have a spacing that is arithmetically changed in the blaze direction, on the entire surface of the curved surface (convex surface).

As a result, it is possible to produce the concave diffraction grating 2 having a sawtooth shape having a substantially constant blaze angle transferred.

Further, according to the present embodiment, it is possible to improve the surface accuracy of the mold 3 of the concave diffraction grating.

Embodiment 4

Figure 8:
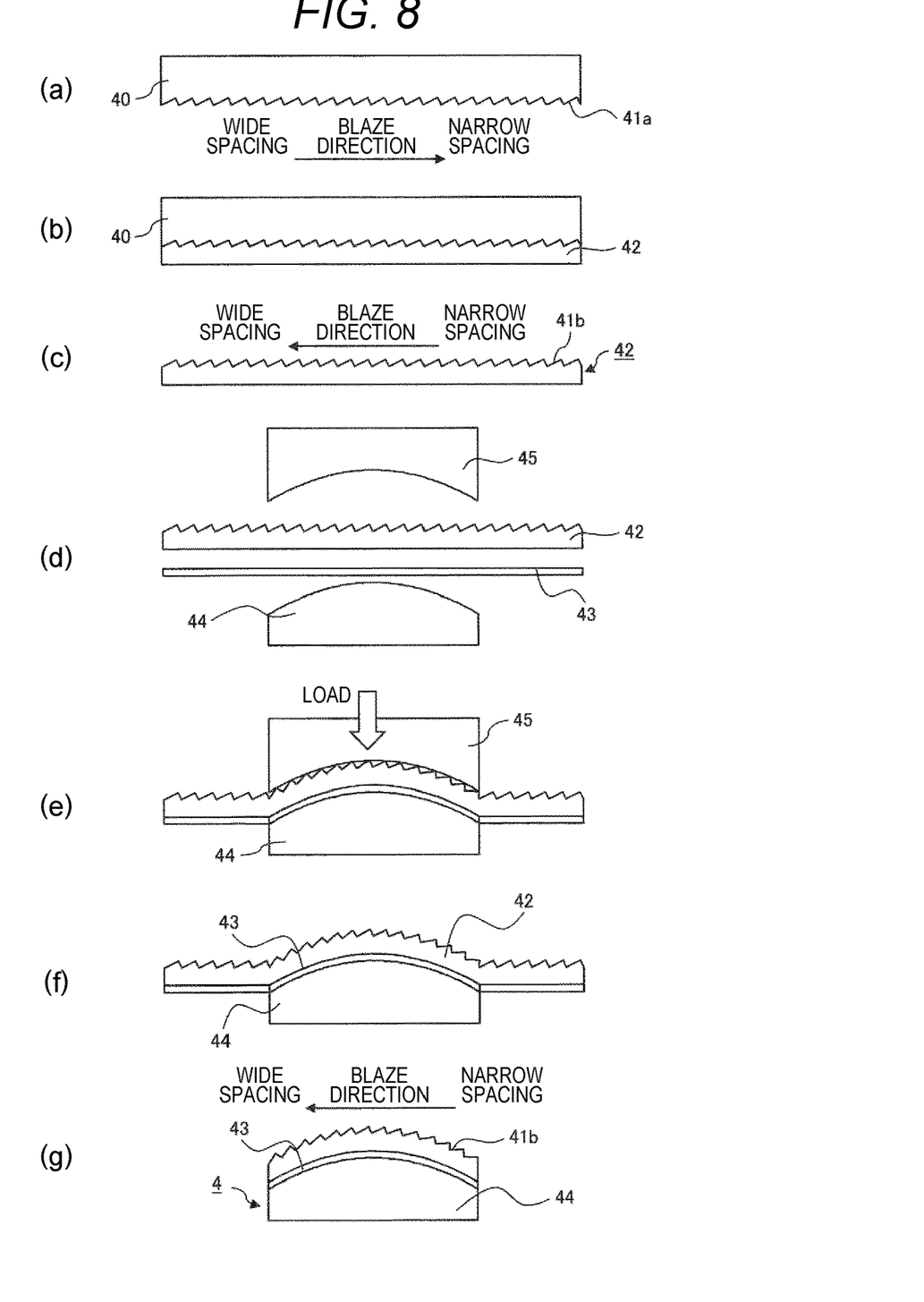
FIG. 8 is a diagram illustrating a method for producing a mold of a concave diffraction grating in Embodiment 4 according to still yet another embodiment of the present invention.

FIG. 8 is a diagram illustrating a method for producing a mold of a concave diffraction grating in Embodiment 4 according to still yet another embodiment of the present invention. FIG. 8(*a*) is a diagram illustrating a step of forming a planar diffraction grating. FIG. 8(*b*) is a diagram illustrating a step of forming a metal diffraction grating. FIG. 8(*c*) is a diagram illustrating a step of separating the metal diffraction grating from the planar diffraction grating. FIG. 8(*d*) is a diagram illustrating a step of installing a concave substrate above the metal diffraction grating and installing a convex substrate below the metal diffraction grating. FIG. 8(*e*) is a diagram illustrating a bonding step. FIG. 8(*f*) is a diagram illustrating a step of detaching the concave substrate. FIG. 8(*g*) is a diagram illustrating a step of obtaining the mold of the concave diffraction grating by removing an outer peripheral portion of the metal diffraction grating.

In the step of forming the planar diffraction grating illustrated in FIG. 8(*a*), grating grooves 41*a* having a sawtooth shape are reduced arithmetically in the blaze direction by mechanical engraving on a planar substrate to form a planar diffraction grating 40. In other words, the spacing between the grating grooves 41*a* of the planar diffraction grating 40 is gradually reduced in the blaze direction. Therefore, the planar diffraction grating 40 has a shape in which the spacing between the grating grooves 41*a* adjacent to each other gradually changes from the wide spacing to the narrow spacing in the blaze direction.

Then, in the step of forming the metal diffraction grating illustrated in FIG. 8(*b*), a seed film is formed on the surface on which the grating grooves 41*a* are formed. Then, the metal is stacked by electrolytic plating to form a metal diffraction grating 42.

In the step of separating the metal diffraction grating from the planar diffraction grating illustrated in FIG. 8(*c*), the seed film is etched from the planar diffraction grating 40 to separate the metal diffraction grating 42. Here, sawtooth grating grooves 41*b* of the metal diffraction grating 42 are formed to have a spacing that is arithmetically increased in the blaze direction. In other words, the spacing between the grating grooves 41*b* of the metal diffraction grating 42 is gradually increased in the blaze direction. Therefore, the metal diffraction grating 42 has a shape in which the spacing between the grating grooves 41b adjacent to each other gradually changes from the narrow spacing to the wide spacing in the blaze direction.

Then, in the step of installing a concave substrate above the metal diffraction grating and installing a convex substrate below the metal diffraction grating, illustrated in FIG. 8(d), the surface of the metal diffraction grating 42 on which the grating grooves 41b are formed is set as a concave substrate 45 side, and an adhesive layer 43 and a convex substrate 44 are installed on an opposite surface of the surface on which the grating grooves 41b are formed. That is, the concave substrate 45 is installed above the surface of the metal diffraction grating 42 on which the grating grooves 41b are formed, so that the concave surface of the concave substrate 45 faces the surface of the metal diffraction grating 42 on which the grating grooves 41b are formed, and the adhesive layer 43 is installed below an opposite surface of the surface of the metal diffraction grating 42 on which the grating grooves 41b are formed, so that the lower surface of the adhesive layer 43 faces the convex surface of the convex substrate 44.

In the bonding step illustrated in FIG. 8(e), in a vacuum atmosphere, a temperature which is equal to or higher than the softening point of the adhesive layer 43 and a load are applied so that the formation surface of the grating groove 41b of the metal diffraction grating 42 is imitated on the concave substrate 45. In addition, the metal diffraction grating 42 is bonded to the convex surface of the convex substrate 44 by the adhesive layer 43.

Then, in the step of detaching the concave substrate illustrated in FIG. 8(f), the adhesive layer 43 is cured by cooling with the load applied, and then the concave substrate 45 is detached (removed). Subsequently, in the step of obtaining the mold of the concave diffraction grating by removing the outer peripheral portion of the metal diffraction grating illustrated in FIG. 8(g), a mold 4 of the concave diffraction grating is formed by removing the outer peripheral portion of the metal diffraction grating 42 deformed on the curved surface (outer peripheral portion which is outside the convex surface of the convex substrate 44 in the metal diffraction grating 42). With the above method, it is possible to form the mold 4 of the concave diffraction grating having a spacing that is arithmetically increased in the blaze direction.

Embodiment 5

Figure 9:
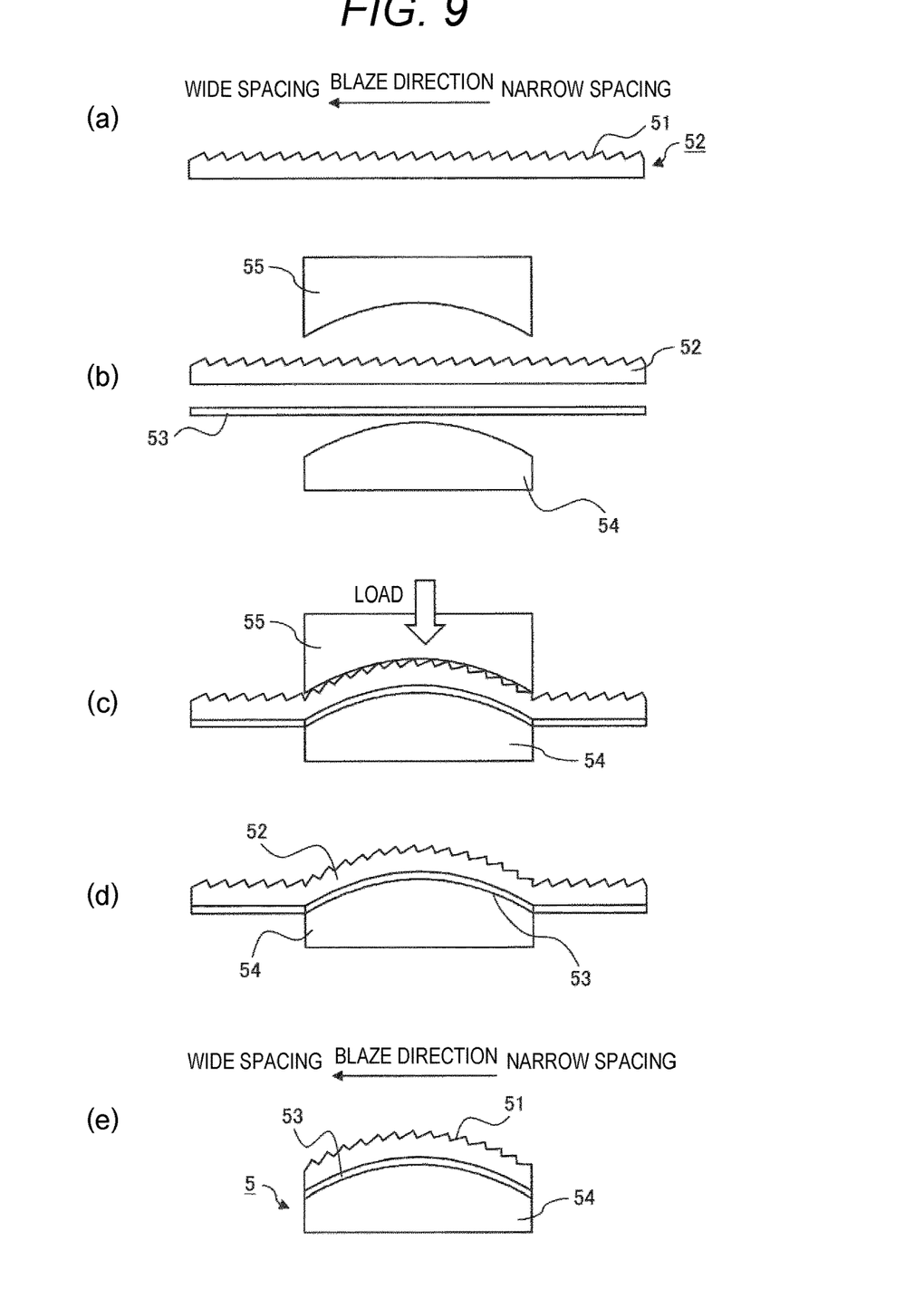
FIG. 9 is a diagram illustrating a method for producing a mold of a concave diffraction grating in Embodiment 5 according to still yet another embodiment of the present invention.

FIG. 9 is a diagram illustrating a method for producing a mold of a concave diffraction grating in Embodiment 5 according to still yet another embodiment of the present invention. FIG. 9(a) is a diagram illustrating a step of forming a metal diffraction grating. FIG. 9(b) is a diagram illustrating a step of installing a concave substrate above the metal diffraction grating and installing a convex substrate below the metal diffraction grating. FIG. 9(c) is a diagram illustrating a bonding step. FIG. 9(d) is a diagram illustrating a step of detaching the concave substrate. FIG. 9(e) is a diagram illustrating a step of obtaining the mold of the concave diffraction grating by removing an outer peripheral portion of the metal diffraction grating.

In the process of forming the metal diffraction grating illustrated in FIG. 9(a), sawtooth grating grooves 51 having a spacing that is arithmetically increased in the blaze direction is formed by a semiconductor process (photo-lithography and etching) on a planar metal substrate, and thus a metal diffraction grating 52 is formed. In other words, the spacing between the grating grooves 51 of the metal diffraction grating 52 is gradually increased in the blaze direction. Therefore, the metal diffraction grating 52 has a shape in which the spacing between the grating grooves 51 adjacent to each other gradually changes from the narrow spacing to the wide spacing in the blaze direction. Here, it is possible to perform producing in a short time by applying the semiconductor process (photo-lithography and etching), in comparison to producing of the metal diffraction grating 52 by mechanical engraving.

Then, in the step of installing a concave substrate above the metal diffraction grating and installing a convex substrate below the metal diffraction grating, illustrated in FIG. 9(b), the surface of the metal diffraction grating 52 on which the grating grooves 51 are formed is set as a concave substrate 55 side, and an adhesive layer 53 and a convex substrate 54 are installed on an opposite surface of the surface on which the grating grooves 51 are formed. That is, the concave substrate 55 is installed above the surface of the metal diffraction grating 52 on which the grating grooves 51 are formed, so that the concave surface of the concave substrate 55 faces the surface of the metal diffraction grating 52 on which the grating grooves 51 are formed, and the adhesive layer 53 is installed below an opposite surface of the surface of the metal diffraction grating 52 on which the grating grooves 51 are formed, so that the lower surface of the adhesive layer 53 faces the convex surface of the convex substrate 54.

In the bonding step illustrated in FIG. 9(c), in a vacuum atmosphere, a temperature which is equal to or higher than the softening point of the adhesive layer 53 and a load are applied so that the formation surface of the grating groove 51 of the metal diffraction grating 52 is imitated on the concave substrate 55. In addition, the metal diffraction grating 52 is bonded to the convex surface of the convex substrate 54 by the adhesive layer 53.

Then, in the step of detaching the concave substrate illustrated in FIG. 9(d), the adhesive layer 53 is cured by cooling with the load applied, and then the concave substrate 55 is detached (removed). Subsequently, in the step of obtaining the mold of the concave diffraction grating by removing the outer peripheral portion of the metal diffraction grating illustrated in FIG. 9(e), a mold 5 of the concave diffraction grating is formed by removing the outer peripheral portion of the metal diffraction grating 52, which is not bonded to the convex surface of the convex substrate 54 (outer peripheral portion which is outside the convex surface of the convex substrate 54 in the metal diffraction grating 52).

As described above, according to the present embodiment, since the sawtooth grating grooves 51 having a spacing that is arithmetically increased in the blaze direction is formed by the semiconductor process (photo-lithography and etching) on the planar metal substrate, and thus the metal diffraction grating 52 is formed, it is possible to perform producing in a short time in comparison to producing of the metal diffraction grating 52 by mechanical engraving.

Embodiment 6

Figure 10:
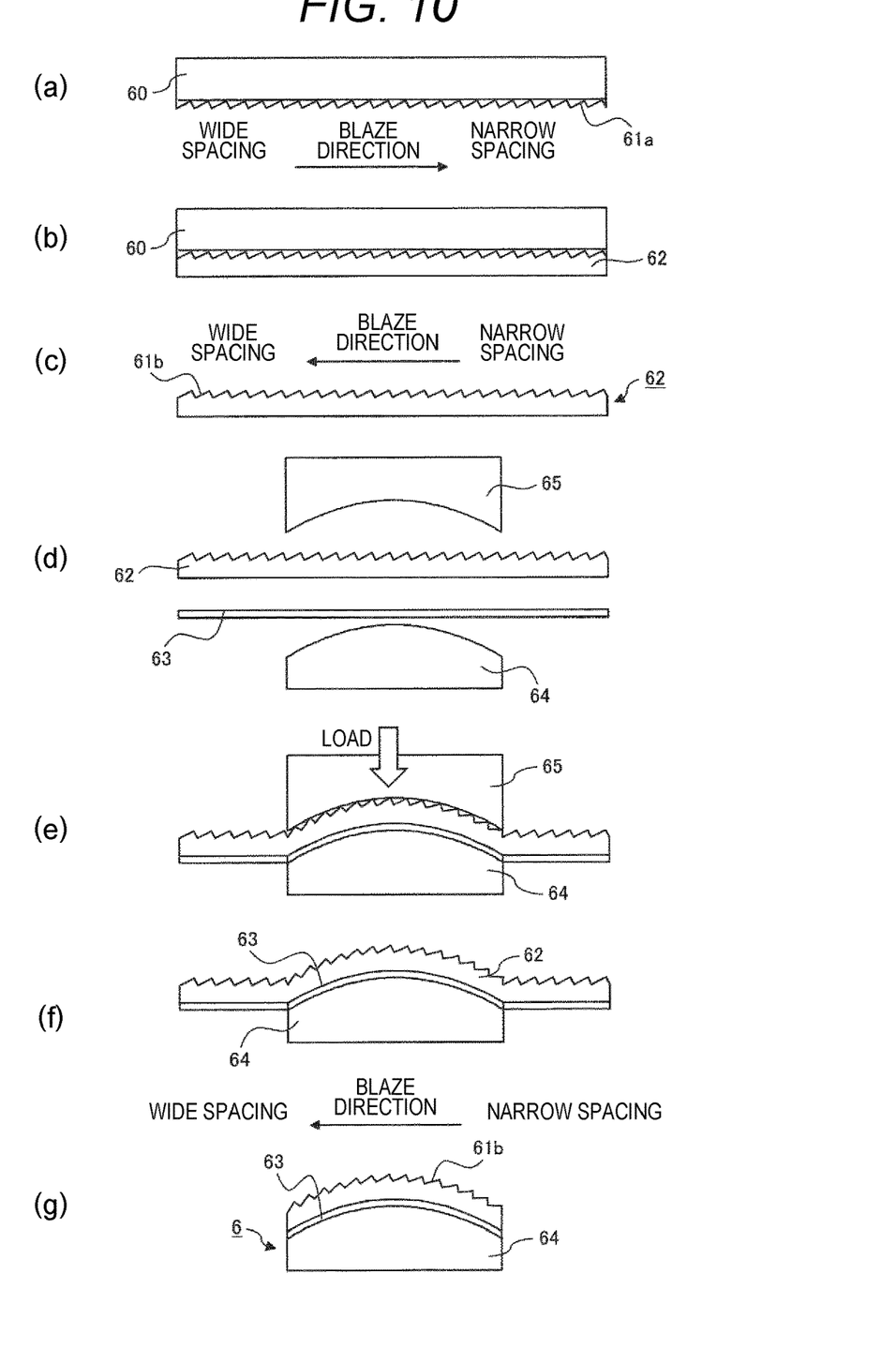
FIG. 10 is a diagram illustrating a method for producing a mold of a concave diffraction grating in Embodiment 6 according to still yet another embodiment of the present invention.

FIG. 10 is a diagram illustrating a method for producing a mold of a concave diffraction grating in Embodiment 6 according to still yet another embodiment of the present invention. FIG. 10(a) is a diagram illustrating a step of forming a planar diffraction grating. FIG. 10(b) is a diagram illustrating a step of stacking a metal material. FIG. 10(c) is a diagram illustrating a step of forming a metal diffraction grating. FIG. 10(d) is a diagram illustrating a step of installing a concave substrate above the metal diffraction grating and installing a convex substrate below the metal diffraction grating. FIG. 10(e) is a diagram illustrating a bonding step. FIG. 10(f) is a diagram illustrating a step of detaching the concave substrate. FIG. 10(g) is a diagram illustrating a step of obtaining the mold of the concave diffraction grating by removing an outer peripheral portion of the metal diffraction grating.

In the process of forming the planar diffraction grating illustrated in FIG. 10(a), grating grooves 61a having a sawtooth shape is formed on a planar substrate with a spacing that is arithmetically reduced in the blaze direction. Thus, a planar diffraction grating 60 is formed. At this time, the grating grooves 61a are formed by photo-lithography with a resist (resin). In other words, the spacing between the grating grooves 61a of the planar diffraction grating 60 is gradually reduced in the blaze direction. Therefore, the planar diffraction grating 60 has a shape in which the spacing between the grating grooves 61a adjacent to each other gradually changes from the wide spacing to the narrow spacing in the blaze direction.

Then, in the step of stacking a metal material illustrated in FIG. 10(b), a seed film is formed on the surface on which the grating grooves 61a are formed, and then the metal material is stacked by electrolytic plating.

In the step of forming the metal diffraction grating illustrated in FIG. 10(c), the metal material is separated from the planar diffraction grating 60, and thus a metal diffraction grating 62 having sawtooth grating grooves 61b is formed with a spacing that is arithmetically increased in the blaze direction. In other words, the spacing between grating grooves 61b of the metal diffraction grating 62 is gradually increased in the blaze direction. Therefore, the metal diffraction grating 62 has a shape in which the spacing between the grating grooves 61b adjacent to each other gradually changes from the narrow spacing to the wide spacing in the blaze direction. Here, it is possible to produce the planar diffraction grating 60 by photo-lithography in a short time in comparison to producing with mechanical engraving. In addition, it is possible to easily separate the metal diffraction grating 62 from the planar diffraction grating 60 by dissolving the resist (resin), when the metal diffraction grating 62 is intended to be separated from the planar diffraction grating 60.

Then, in the step of installing a concave substrate above the metal diffraction grating and installing a convex substrate below the metal diffraction grating, illustrated in FIG. 10(d), the surface of the metal diffraction grating 62 on which the grating grooves 61b are formed is set as a concave substrate 65 side, and an adhesive layer 63 and a convex substrate 64 are installed on an opposite surface of the surface on which the grating grooves 61b are formed. That is, the concave substrate 65 is installed above the surface of the metal diffraction grating 62 on which the grating grooves 61b are formed, so that the concave surface of the concave substrate 65 faces the surface of the metal diffraction grating 62 on which the grating grooves 61b are formed, and the adhesive layer 63 is installed below an opposite surface of the surface of the metal diffraction grating 62 on which the grating grooves 61b are formed, so that the lower surface of the adhesive layer 63 faces the convex surface of the convex substrate 64.

In the bonding step illustrated in FIG. 10(e), in a vacuum atmosphere, a temperature which is equal to or higher than the softening point of the adhesive layer 63 and a load are applied so that the formation surface of the grating groove 61b of the metal diffraction grating 62 is imitated on the concave substrate 65. In addition, the metal diffraction grating 62 is bonded to the convex surface of the convex substrate 64 by the adhesive layer 63.

Then, in the step of detaching the concave substrate illustrated in FIG. 10(f), the adhesive layer 63 is cured by cooling with the load applied, and then the concave substrate 65 is detached (removed). Subsequently, in the step of obtaining the mold of the concave diffraction grating by removing the outer peripheral portion of the metal diffraction grating illustrated in FIG. 10(g), a mold 6 of the concave diffraction grating is formed by removing the outer peripheral portion of the metal diffraction grating 62 deformed on a curved surface, which is not bonded to the convex surface of the convex substrate 64 (outer peripheral portion which is outside the convex surface of the convex substrate 64 in the metal diffraction grating 62).

As described above, according to the present embodiment, since the planar diffraction grating 60 is produced by photo-lithography, it is possible to produce the planar diffraction grating 60 in a short time in comparison to producing by mechanical engraving. In addition, it is possible to easily separate the metal diffraction grating 62 from the planar diffraction grating 60 by dissolving the resist (resin), when the metal diffraction grating 62 is intended to be separated from the planar diffraction grating 60.

The present invention is not limited to the above embodiments, and various modifications may be provided.

For example, the above embodiments are described in detail in order to explain the present invention in an easy-to-understand manner, and the above embodiments are not necessarily limited to a case including all the described configurations. Further, some components in one embodiment can be replaced with the components in another embodiment, and the configuration of another embodiment can be added to the configuration of one embodiment.

REFERENCE SIGNS LIST 1 optical device
2 concave diffraction grating
3, 4, 5, 6 mold of concave diffraction grating
11 light source
12a, 12b focusing lens
13 sample chamber
14 slit
16 detector
21 grating groove
22 metal layer
23 resin layer
24 concave substrate
30, 50, 60 planar diffraction grating
31, 41, 51, 61 grating groove
32, 42, 52, 62 metal diffraction grating
33, 43, 53, 63 adhesive layer
34, 44, 54, 64 convex substrate
35, 45, 55, 65 concave substrate

The invention claimed is:
1. A concave diffraction grating for dispersing and focusing light, and having a spherical concave surface, the grating comprising:
sawtooth grating grooves on a concave substrate,
wherein the sawtooth grating grooves are obtained by transferring a mold of the concave diffraction grating, and
the mold of the concave diffraction grating is produced by forming sawtooth grating grooves on a planar substrate, the sawtooth grating grooves in which a spacing is arithmetically reduced in a blaze direction, and a blaze angle is constant.

2. A concave diffraction grating for dispersing and focusing light, and having a spherical concave surface, the grating comprising:

sawtooth grating grooves on a concave substrate, wherein the sawtooth grating grooves adjacent to each other are obtained by transferring a mold of the concave diffraction grating, and the mold of the concave diffraction grating is produced by forming sawtooth grating grooves on a planar substrate, the sawtooth grating grooves in which a spacing gradually changes from a wide spacing to a narrow spacing in a blaze direction, and a blaze angle is constant.

3. An optical device comprising:

a first focusing lens that focuses light emitted from a light source and irradiates a sample with the light;

a second focusing lens that focuses transmitted light obtained by light being transmitted through the sample, to an opening portion of a slit; and a concave diffraction grating that wavelength-disperses the light that is transmitted through the opening portion of the slit and guides the light to a plurality of detectors, having a spherical concave surface, wherein the concave diffraction grating has sawtooth grating grooves on a concave substrate, the sawtooth grating grooves are obtained by transferring a mold of the concave diffraction grating, and the mold of the concave diffraction grating is produced by forming the sawtooth grating grooves on a planar substrate, the sawtooth grating grooves in which a spacing is arithmetically reduced in a blaze direction, and a blaze angle is constant.

4. The optical device according to claim 3, wherein the plurality of detectors are arranged on a straight line.

5. An optical device comprising:

a first focusing lens that focuses light emitted from a light source and irradiates a sample with the light;

a second focusing lens that focuses transmitted light obtained by light being transmitted through the sample, to an opening portion of a slit; and a concave diffraction grating that wavelength-disperses the light that is transmitted through the opening portion of the slit and guides the light to a plurality of detectors, having a spherical concave surface, wherein the concave diffraction grating has sawtooth grating grooves on a concave substrate, the sawtooth grating grooves adjacent to each other are obtained by transferring a mold of the concave diffraction grating, and the mold of the concave diffraction grating is produced by forming the sawtooth grating grooves on a planar substrate, the sawtooth grating grooves in which a spacing gradually changes from a wide spacing to a narrow spacing in a blaze direction, and a blaze angle is constant.

6. A method for producing a concave diffraction grating, the method comprising:

a step of forming a sawtooth shape on a planar substrate by photo-lithography and etching or machining and making a shape in which a spacing between grating grooves having the sawtooth shape is arithmetically reduced in a blaze direction and a blaze angle is constant, so as to prepare a planar diffraction grating substrate;

a step of installing a concave substrate so that a concave surface faces a surface on which the grating grooves are formed and installing a convex substrate through an adhesive layer so that a convex surface faces an opposite surface of the surface on which the grating grooves are formed;

a bonding step of imitating the surface of the planar diffraction grating substrate, on which the grating grooves are formed, onto the concave substrate, and bonding the planar diffraction grating substrate to the convex substrate by the adhesive layer;

a step of detaching the concave substrate, and then removing an outer peripheral portion which is outside the convex surface of the convex substrate in the planar diffraction grating substrate, so as to form a mold of a concave diffraction grating having a spherical concave surface; and a step of transferring the mold of the concave diffraction grating to a surface of metal or resin.

7. A method for producing a concave diffraction grating, the method comprising:

a step of forming a sawtooth shape on a planar substrate by photo-lithography and etching or machining and making a shape in which a spacing between grating grooves having the sawtooth shape and being adjacent to each other gradually changes from a wide spacing to a narrow spacing in a blaze direction and a blaze angle is constant, to prepare a planar diffraction grating substrate;

a step of installing a concave substrate so that a concave surface faces a surface on which the grating grooves are formed and installing a convex substrate through an adhesive layer so that a convex surface faces an opposite surface of the surface on which the grating grooves are formed;

a bonding step of imitating the surface of the planar diffraction grating substrate, on which the grating grooves are formed, onto the concave substrate, and bonding the planar diffraction grating substrate to the convex substrate by the adhesive layer;

a step of detaching the concave substrate, and then removing an outer peripheral portion which is outside the convex surface of the convex substrate in the planar diffraction grating substrate, so as to form a mold of a concave diffraction grating having a spherical concave surface; and a step of transferring the mold of the concave diffraction grating to a surface of metal or resin.

* * * * *